US012650411B2

(12) United States Patent

Grigoropoulos et al.

(10) Patent No.: US 12,650,411 B2

(45) Date of Patent: Jun. 9, 2026

(54) DEFECT DETECTION METHOD AND SYSTEM USING HIGH FREQUENCY WAVES

(71) Applicant: The Hong Kong University of Science and Technology, Hong Kong (CN)

(72) Inventors: Georgios Grigoropoulos, Hong Kong (CN); Saber Nasraoui, Hong Kong (CN); Moez Louati, Hong Kong (CN); Mohamed Salah Ghidaoui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 315 days.

(21) Appl. No.: 18/399,826

(22) Filed: Dec. 29, 2023

(65) Prior Publication Data

US 2024/0219355 A1 Jul. 4, 2024

Related U.S. Application Data

(60) Provisional application No. 63/478,355, filed on Jan. 4, 2023.

(51) Int. Cl.
*G01M 3/24* (2006.01)
*G01N 29/12* (2006.01)
(Continued)

(52) U.S. Cl.
CPC ........... *G01N 29/348* (2013.01); *G01N 29/12* (2013.01); *G01N 29/2412* (2013.01); *G01N 29/36* (2013.01)

(58) Field of Classification Search
CPC ............ G01M 3/00; G01M 3/24; G01M 3/28; G01N 29/00; G01N 29/12; G01N 29/14;
(Continued)

(56) References Cited

U.S. PATENT DOCUMENTS

| | | | | |
|---|---|---|---|---|
| 7,266,992 B2 * | 9/2007 | Shamout | ............... | G01M 3/243 |
| | | | | 73/49.1 |
| 7,423,931 B2 * | 9/2008 | Martin, II | .............. | H04B 13/00 |
| | | | | 367/83 |

(Continued)

FOREIGN PATENT DOCUMENTS

| | | |
|---|---|---|
| CN | 105510444 A | 4/2016 |
| CN | 108119764 A | 6/2018 |

(Continued)

OTHER PUBLICATIONS

Machine Translation of KR-20180065581-A (Year: 2018).*

(Continued)

*Primary Examiner* — Nguyen Q. Ha

(74) *Attorney, Agent, or Firm* — S&F/WEHRW

(57) ABSTRACT

A defect detection method is provided for a pressurized pipe having at least one defect. According to the method, an acoustic source generates a probing wave of a frequency range from 10 kHz to 100 kHz, where the probing wave is scattered by the at least one defect to create a reflected wave; an acoustic receiver measures a wave response to obtain a measured response, where the measured response is attributed essentially to a superposition of the probing wave and the reflected wave; and a computer device processes the measured response to locate the at least one defect.

19 Claims, 10 Drawing Sheets

(51) Int. Cl.

| | | |
|---|---|---|
| *G01N 29/14* | (2006.01) | |
| *G01N 29/24* | (2006.01) | |
| *G01N 29/34* | (2006.01) | |
| *G01N 29/36* | (2006.01) | |

(58) Field of Classification Search

CPC .............. G01N 29/24; G01N 29/2412; G01N 29/34–52; G01N 29/348

See application file for complete search history.

(56) References Cited

U.S. PATENT DOCUMENTS

| | | | | |
|---|---|---|---|---|
| 7,833,162 B2 * | 11/2010 | Hasegawa | .............. | A61B 8/445 |
| | | | | 600/459 |
| 9,983,092 B2 * | 5/2018 | Howitt | .................... | E03B 7/071 |
| 2003/0138053 A1 * | 7/2003 | Candy | ................. | H04B 7/0615 |
| | | | | 375/259 |
| 2022/0128427 A1 * | 4/2022 | Bowen | .................... | G01S 15/87 |
| 2024/0183741 A1 * | 6/2024 | Luccini | .................... | F23M 5/08 |

FOREIGN PATENT DOCUMENTS

| | | | | | |
|---|---|---|---|---|---|
| CN | 109187754 B | | 1/2019 | | |
| KR | 20180065581 A | * | 6/2018 | ............. | G08C 17/02 |
| WO | WO-2021220371 A1 | * | 11/2021 | ............. | G01M 3/24 |

OTHER PUBLICATIONS

Machine Tanslation of WO-2021220371-A1 (Year: 2021).*

Jose María Carrillo et.al., Proceedings of the 1st IAHR Young Professionals Congress., Nov. 17-18, 2020.

Mo et.al., TR Self-Adaptive Cancellation Based Pipeline Leakage Localization Method Using Piezoceramic Transducers., Sensors 2022, 22, 696.

* cited by examiner

DEFECT DETECTION METHOD AND SYSTEM USING HIGH FREQUENCY WAVES

CROSS-REFERENCE TO RELATED APPLICATIONS

This application claims priority to the U.S. provisional patent application Ser. No. 63/478,355, filed Jan. 4, 2023, entitled "Defect detection in pressurized pipelines using time reversal of high frequency waves", hereby incorporated herein by reference as to its entirety.

FIELD OF THE DISCLOSURE

The present disclosure generally relates to defect detection, and more particularly to detecting defects in a pipeline system carrying a fluid using high frequency waves.

BACKGROUND

One critical global challenge concerning the built environment is the gradual decay of urban water supply networks. These water systems are currently fraught with defects and inefficiencies, such as leaks and blockages, leading to major economic losses, disruptions, and potential health hazards. It is estimated that 126 billion cubic meters are unaccounted for annually by water utilities around the world, for an equivalent monetary loss of USD 39 billion. The energy used to treat, transport, and pump this amount of lost water is staggering and leaves a significant carbon footprint.

The identification of imminent or existing faults is a formidable task since water supply networks are buried underground and demonstrate intricate topologies. In this regard, the development of defect detection technologies is the pragmatic solution recommended by many water-concerning organizations. The global state of water supply systems indicates that the existing technologies are inefficient or unsatisfactory to curb the losses and resolve pipeline health-related issues.

It is an object of the present disclosure to overcome or substantially ameliorate one or more of the disadvantages of prior art, or at least to provide a useful alternative.

SUMMARY

In one aspect of the present disclosure there is provided a method of defect detection for a pressurized pipe having at least one defect, the method comprising generating, by an acoustic source located at $x_s$, a probing wave of a frequency range from 10 kHz to 100 kHz, the probing wave being scattered by the at least one defect to create a reflected wave; measuring, by an acoustic receiver located at $x_m$, a wave response to obtain a measured response, the measured response being attributed essentially to a superposition of the probing wave and the reflected wave; and processing, by a computer device, the measured response to locate the at least one defect.

In another aspect of the present disclosure there is provided a system of defect detection for a pressurized pipe having at least one defect, the system comprising an acoustic source located at $x_s$ along the pressurized pipe for generating a probing wave of a frequency range from 10 kHz to 100 kHz; an acoustic receiver located at $x_m$ for obtaining a measured response that comprises a superposition of the probing wave and a reflected wave, the reflected wave being generated by scattering of the probing wave by the at least one defect; and a computer device for processing the measured response to locate the at least one defect.

In a further aspect of the present disclosure there is provided a method of defect detection for a pressurized pipe having at least one defect, the method comprising receiving a measured response from an acoustic receiver, wherein the measured response comprises a superposition of a probing wave and a reflected wave, the probing wave being generated by an acoustic source and having a frequency range from 10 kHz to 100 kHz, the reflected wave being generated by scattering of the probing wave by the at least one defect; sampling the measured response at a sampling frequency that is at least ten times of a maximum frequency in the frequency range; determining a defect-related response $\Delta\hat{p}$ from the measured response, the defect-related response $\Delta\hat{p}$ being attributed to the at least one defect and expressed in frequency domain; computing a conjugation operation of the defect-related response $\Delta\hat{p}$ to obtain $\Delta\hat{p}^*$; computing an objective function by performing a convolution operation between a pre-determined analytical response and $\Delta\hat{p}^*$; and determining defect location for the at least one defect by identifying maximum of the objective function.

Other example embodiments are discussed herein.

BRIEF DESCRIPTION OF THE DRAWINGS

Embodiments of the disclosure will now be described, by way of example only, with reference to the accompanying drawings in which.

DETAILED DESCRIPTION

Figure 1A:
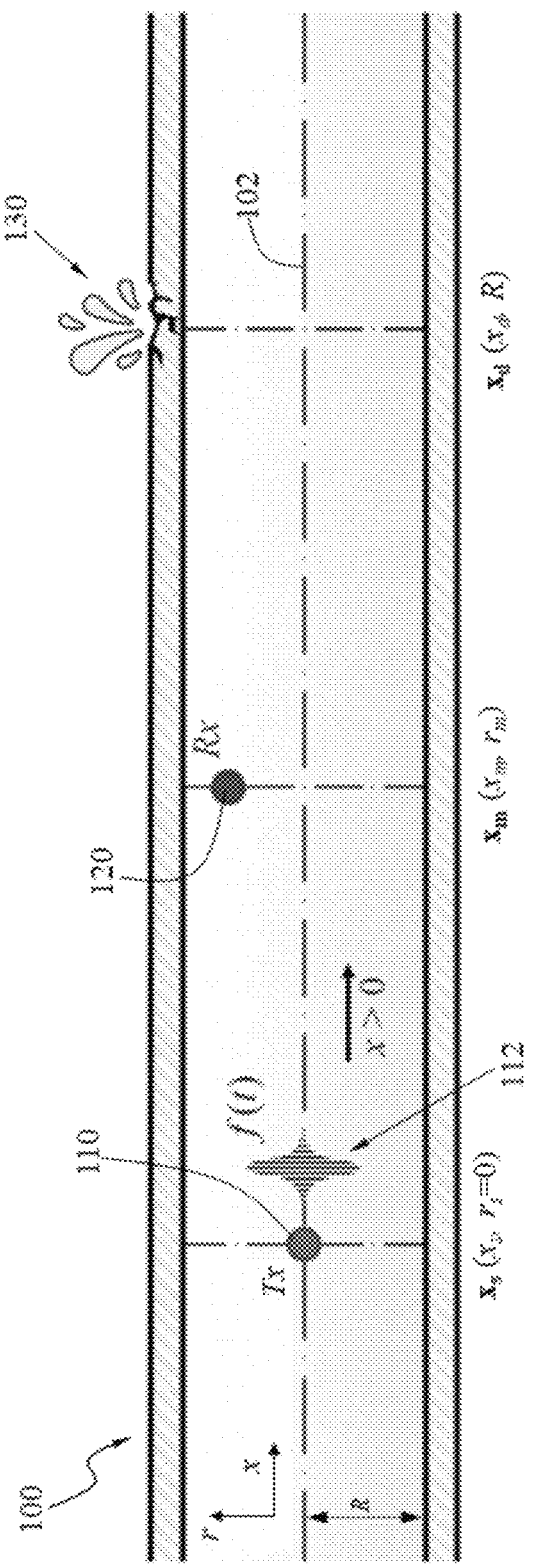
FIG. 1A illustrates a pipeline model used for developing defect detection technique according to certain embodiments of the present disclosure.

The present disclosure will now be described with reference to the following examples which should be considered in all respects as illustrative and non-restrictive. In the Figures, corresponding features within the same embodiment or common to different embodiments may be given the same or similar reference numerals.

Throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", etc., to describe a common object, merely indicate that different instances of like objects are being referred to, and are not intended to imply that the objects so described must be in a given sequence, either temporally, spatially, in ranking, or in any other manner.

Example embodiments relate to method and system for defect detection that enable an efficient identification of defects in a pipeline system using high frequency waves. The high frequency may range from 10 kHz to 100 kHz.

Many existing technologies are unsatisfactory in one aspect or another. Some methods for defect diagnosis require isolation of specific segments of a pipeline network, and are therefore disruptive and involve significant costs. Less invasive techniques such as acoustic correlators or ground penetrating radars have limited applicable range over the pipeline network and are susceptible to noise. Transient-based defect detection techniques have limited resolution due to the use of low frequency (<100 Hz) pressure waves that are generated by slow mechanical devices (such as valves) or sudden pipe bursts (i.e., passive defect detection).

Another existing technology adopts Transient-Based Defect Detection Methods (TBDDMs). The crux of TBDDMs is that the injected pressure signal is modified in accordance with both physical characteristics of the system and potential defects as the signal propagates along the pipeline. Subsequently, the recorded response contains the defect signatures that, if properly analysed and processed, may identify the defects in the system. The various methodologies developed in the framework of TBDDMs may be grouped into the following categories: (1) inverse transient methods (ITM); (2) transient reflection-based methods (TRM); (3) transient damping-based methods (TDM); and (4) frequency response-based methods (FRM). A common trait is that these methods are based on low frequency transients (<100 Hz) that are most often produced by operation of relatively slow mechanical devices, such as valves, and thus assume simple one-dimensional wave propagation. On the other hand, since the achievable resolution is directly proportional to the probing wavelength (i.e. wavelength of the transient waves), low frequency transients cannot resolve features (such as defects) whose scale is of the order of tens of meters or less. As such, the present inventors have recognized that to improve the resolution of defect detection, it may be instrumental to employ high-frequency pressure waves (>10 kHz) emitted by an acoustic source, such as a piezoelectric transducer. However, the present inventors have also recognized that high frequency wave propagation in bounded waveguides is a dispersive phenomenon in general, and identifying the location of a defect from its reflections is an ill-posed inverse problem bounded by noise and modelling errors.

Example embodiments solve one or more of the prior art problems and provide a technical solution with improved defect detection for a pressurized pipe. According to one or more embodiments, a novel defect detection technique is provided. One or more embodiments propose the use of actively generated high-frequency acoustic waves or probing signals or probing waves (with frequency in the range from 10 kHz to 100 kHz with both ends inclusive) in pipeline systems. Note that a probing wave may be the combination of a series of waves, and each wave has a specific frequency and wavelength. Therefore, when it is referenced to the frequency or wavelength of a probing wave or probing waves, the frequency or wavelength may be understood as a series of frequencies or wavelengths. The term "frequency range" may be used in such context. The probing waves interact with one or more defects to induce reflections or reflected waves that carry useful information of the defects. Let the probing signals have a wavelength $\lambda$ in the order of the pipe radius or smaller (for the stated frequency range, $\lambda$~1 cm to 10 cm), the present technique achieves a defect detection resolution unmatched from existing techniques. Moving from the low to high-frequency regime in TBDDMs is not something that is predicable or can be done without any inventive efforts. Rather, it requires a considerable leap in knowledge and overcome technical obstacles. This is because high-frequency wave propagation through a fluid-filled pipeline is a dispersive phenomenon. The present pipeline defect detection technology according to one or more embodiments is based on the wave time reversal property that has been experimentally proven for both elastic and viscoelastic fluid-filled pipes.

The method for defect detection according to one or more embodiments comprises two distinct phases: (a) an experimental step and (b) a theoretical step. In the experimental step, the pipeline system is probed with a high-frequency pressure wave pulse (with minimum wavelength $\lambda_{min}$<R, where R is the pipe radius, which is the radius of the cross-section of the pipe) that propagates and is modified in accordance with both the physical characteristics of the pipeline system and potential defects (such as leaks and blockages). Put it differently, defects function as passive acoustic sources and the probing pulse is scattered off due to the impedance discontinuity in the waveguide. The measured response of the pipeline system can be sampled at a high rate. For example, the sampling rate can be at least 10 times the maximum probing frequency, such as 1 million samples per second to resolve a probing frequency f=100 kHz. The measured response after sampling can be used as input to the theoretical step. In the theoretical step, the measured response is processed by a computer device. The prediction of an analytical model of the pipeline system (that also accounts for the wave/defect interaction) is convolved with the time-reversed response from the experimental step. The analytical model is an analytical response that accounts for the interaction between the probing wave and the defects. The analytical model may be known through theoretical calculation, empirical estimation, or other means. The validity of wave time reversal in pipelines ensures that the convolution product is maximized at the defect (i.e., passive source) location. It will be understood by the skilled person that the disclosed technique according to one or more embodiments may be generally used for defect detection in various pressurized pipes. The pressurized pipes are not limited to water supply pipelines, but can also be other pipes pressurized with oil, or gas, or a mixture of liquid and gas, etc. The pipes may be made of various proper materials.

One or more embodiments comprise an active defect detection technique for pressurized pipelines based on the wave time reversal property of high frequency probing waves (10 kHz to 100 kHz). This technique overcomes the low resolution barrier for existing methods that employ comparatively low frequency waves (<100 Hz). These high frequency pressure signals may be generated by a piezoelectric transducer that is placed in the fluid and along the pipe centreline. In particular, the disclosed method comprises an experimental step and a theoretical step. In the experimental step, an acoustic source positioned along the centerline of the pipe injects a user-specified high-frequency pressure signal that disperses and scatters off the defect to transform it into a passive acoustic source whose response is captured. In the theoretical step, the captured signal reflects difference between the equivalent response of an intact system and the effect of the defect. Then, the wave portion that corresponds to the defect effect is time-reversed (its chronological order is reversed) and remitted into a model of the pipeline. According to the validity of time reversal technique, the wave will backpropagate and refocus at its source i.e., the defect. In practice, the obtained response from the experimental step is convolved with a simulated or analytical response for a given candidate defect location. The product of this convolution operation (which represents the physical time reversal process) is uniquely maximized at the location of the defect with a resolution proportional to the probing wavelength (such as in the order of centimetres). Indeed, it will be proven that the time reversed response is the optimal filter that maximizes the attainable signal-to-noise ratio (SNR). The methodology according to one or more embodiments is capable of resolving defects with size of at least the order of the probing wavelength, uses a single measurement, and enables real time detection owing to the fast computation time of the proposed analytical solution. The present disclosure has been validated through rigorous experimental testing for detecting singular anomalies along pipelines, such as leaks or blockages.

Figure 1B:
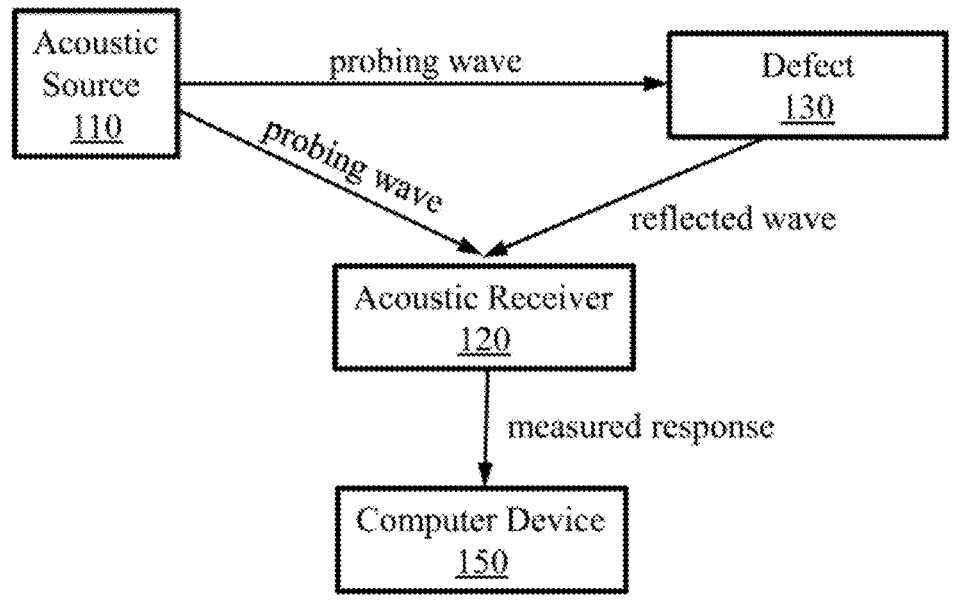
FIG. 1B illustrates how a measured response is derived from interaction of the generated probing wave and the reflected wave for the pipeline model of FIG. 1A.

Referring to FIGS. 1A and 1B, for illustrative purpose and without loss of generality, a pipe 100 is illustrated as an elastic cylindrical pipe having a constant cross section (radius: R). The pipe 100 is filled with a fluid in the form of water characterized by a wave speed $c_f$. Let x, r and $\theta$ be three coordinates in a cylindrical coordinate system, where the x direction coincides with the longitudinal axis or pipe centerline 102 of the pipe 100. The pipe 100 has a defect in the form of a leak 130 located at $x_d=(x_d, R, \theta_d)$. An acoustic source 110 (denoted also as Tx) is disposed along the pipe centreline 102 and located at $x_s=(x_s=0, r_s=0)$. An acoustic receiver 120 (denoted also as Rx) is located at $x_m=(x_m, r_m, \theta_m)$. Note that the acoustic source 110 excites pressure field, such as an axisymmetric pressure field, which is independent of the azimuthal coordinate $\theta$. Each of the acoustic source 110 and acoustic receiver 120 may be a transducer, such as watertight piezoelectric transducer, such as a hydrophone. In some embodiments, the acoustic source and the acoustic receiver are configured as a single transducer that is switchable to perform functions of an emitter or a receiver.

Referring to FIGS. 1A and 1B, more details of embodiments will be described below. The skilled person in the art will understand these details are for illustrative purpose only and one or more elements as described are not necessarily essential to implement one or more embodiments, but rather may be preferable or optional in certain embodiments.

Experimental Step

A probing wave 112 is generated or injected into the pipeline system. The probing wave 112 can be generated by the acoustic source 110 and expressed as f(t) in time domain. In frequency domain, the probing wave 112 is expressed as $\hat{f}(\omega)$, which can be a Fourier transform of f(t). The probing wave may be known or customized by setting the system setup such that frequency of the probing wave is sufficiently high, such as in a range from 10 kHz to 100 kHz. For example, the probing wave $\hat{f}(\omega)$ may be generated or stimulated or excited or injected in the pipeline system at $x_s$. The probing wave $\hat{f}(\omega)$ may have a frequency range that comprises multiple frequencies. The frequency range comprises a minimum frequency and a maximum frequency and one or more frequencies therebetween. Let the number of the frequencies be N, then the angular frequency vector $\omega=[\omega_1, \ldots, \omega_N]T$. Define $\bar{\omega}=\omega_d R/c_f$ as a dimensionless variable where $\omega_d$ is the dimensional angular frequency. $\hat{f}(\omega)$ may be a Gaussian modulated sine pulse with a central frequency $f_c$ and bandwidth $b_w$ adequate to excite multiple propagating radial modes in a fluid-filled pipe waveguide. In some embodiments, $\hat{f}(\omega)$ can be a linear frequency modulated sine pulse (such as a chirp) that sweeps across a predefined frequency range (such as a bandwidth), and also excites the radial modes.

The generated probing wave 112 propagates along the fluid-filled pipe 100 and interacts with the defect 130 located at $x_d$. The wave signal may be partly or wholly scattered, and the resulting pressure field in the fluid-filled pipe waveguide is measured by the acoustic receiver 120 at $x_m$. In some embodiments and for practical reasons, location $x_m$ may be placed at the same longitudinal position as $x_s$ such that $x_m=x_s$. The total acoustic pressure field at $x_m$ comprises a superposition of the incident (i.e., probing) and reflected waves. The incident wave corresponds to the intact pipeline system response and has a pressure field denoted by $\hat{p}^{intact}$, while the reflected wave is due to presence of the defect in the pipeline system and has a pressure field denoted by $\hat{p}^{defect}$. Therefore, the total pressure field $\hat{p}$ at $x_m$ (which is the measured response) to the probing wave $\hat{f}(@)$, is expressed as:

$$\hat{p}(x_m, \omega) = \hat{p}^{intact} + \hat{p}^{defect} + n \qquad (1)$$

where n represents the measurement noise.

Theoretical Step

The theoretical step can be performed by a computer device 150 or a system comprising the computer device 150. Frequency discretization may be performed for the pressure field response vector $\hat{p}$. The pressure field response vector $\hat{p}$ is discretised into N frequencies, such that $\hat{p}=[\hat{p}_1(x_m, \omega_1), \ldots, \hat{p}_N(x_m, \omega_N)]^T$, $\hat{p}^{intact}=[\hat{p}_1^{intact}(x_m, \omega_1), \ldots,$ $\hat{p}_N{}^{intact}(x_m, \omega_N)]^T$, and $\hat{p}^{defect}=[\hat{p}_1{}^{defect}(x_m, \omega_1), \ldots, \hat{p}_N{}^{defect}$ $(x_m, \omega N)]^T$. In the present embodiment, the measurement noise vector n is considered to follow a zero-mean Gaussian distribution N $(0, \sigma^2 I_N)$ with $I_N$ being the N dimensional identity vector.

The reflected wave and noise can be isolated or extracted from the pressure field response vector $\hat{p}$. The defect-related response can be expressed as a difference between the measured response and the pertinent intact response $\hat{p}^{intact}$ as:

$$\Delta\hat{p} = \hat{p}^{defect} + n \tag{2}$$

In some embodiments, the part of the measured response in the time domain that corresponds to the effect of the defect (i.e., $\Delta\hat{p}$) can be identified after time T, where T is the duration of the injected acoustic pressure pulse f(t) under the condition that $x_m=x_s$ and $(x_d-x_m)>Tc_f/2$. Notably, the intact pipe response $\hat{p}^{intact}$ can be obtained from an analytical pressure wave solution for a fluid-filled pipe for the case of no presence of any defect, and expressed as:

$$\hat{p}^{intact} = -\hat{f}(\omega)\hat{G}(x_m \mid x_s) \tag{3}$$

where $\hat{G}$ is Green's function for a fluid-filled elastic pipe in the frequency domain and can be given by $$\hat{G}(x \mid x_s, \omega) = \frac{i}{2\pi}\sum_\mu \frac{J_0(k_{r\mu}r_s)J_0(k_{r\mu}r)}{k_{x\mu}\left(1 - \dfrac{\omega^2}{k_{r\mu}^2 Z^2(\omega, k_{r\mu})}\right)J_0^2(k_{r\mu})}e^{-ik_{x\mu}|x-x_s|} \tag{4}$$

$\hat{G}$ represents the system impulse response that comprises the sum of multiple propagating modes $\mu$, each described by the dimensionless (i.e., multiplied by the pipe radius R) modal axial and radial wavenumbers, $k_{x\mu}$ and $k_{r\mu}$, respectively. $J_0$ is the Bessel function of the first kind and zeroth order, and $Z(\omega, k_{r\mu})$ describes the impedance condition at the fluid-pipe wall interface. The impedance equation may be obtained as below:

$$Z(\omega, k_{r\mu}) = -\frac{i}{\alpha^2\gamma^2\omega}\left[1 - \gamma^2\omega^2 - \frac{v^2}{1-c^2} + \frac{\xi\gamma^4\omega^4(1-c^2)}{c^2[c^2 + \xi\eta\gamma^2(1-c^2)]}\right] \tag{5}$$

where $\alpha^2=\rho_f R/\rho_p$, is an indicator of the mass distribution among the fluid and structure domains, $\rho_p$ is the density of the pipe material, $\rho_f$ is the density of the fluid, and h is the thickness of the pipe wall. Moreover, $\gamma$ is a measure of the relative stiffness between the two parts of the coupled waveguide and is the ratio of the compressional wave speed in the fluid $c_f$ to that in the pipe wall $c_p$, where $c_p=[E/\rho_p(1-v)^2]^{1/2}$, E being the Young's modulus and v being Poisson's ratio of the pipe material. Notet that E may take complex values when, for instance, the pipe is viscoelastic (e.g., made of High Density Polyethylene (HDPE)). Two correction factors are also introduced. The first one is $\zeta=h^2/12R^2$ that accounts for curvature of the pipe wall. The second one is $\eta=2/(1-v)K$ for the distribution of the shear stresses across the pipe wall, where K can be taken equal to $\frac{8}{9}$. Then, phase velocity $c_{ph}$ is normalized by $c_p$ to obtain the dimensionless phase velocity c. Phase velocity $c_{ph}$ is formally defined as $\omega_d/k_{x\mu d}$. Thus, the dimensionless phase velocity c in terms of $\omega$ and $k_{r\mu}$ is expressed as:

$$c = \gamma\frac{\omega}{\sqrt{\omega^2 - k_{r\mu}^2}} \tag{6}$$

since $k_{x\mu}=(\omega^2-k_{r\mu}^2)^{1/2}$, a valid radial wavenumber $k_{r\mu}$ for each propagating mode $\mu$ and for a given frequency $\omega$ can be obtained by solving the following characteristic equation of the waveguide:

$$\frac{J_0(k_{r\mu})}{k_{r\mu}J_1(k_{r\mu})} = -\frac{i}{\omega}Z(\omega, k_{r\mu}) \tag{7}$$

The characteristic equation is solved over the frequency bandwidth of interest, and the occurring $k_{r\mu}$-$\omega$ pairs are used to calculate the Green's function $\hat{G}$. Both the wall impedance (see Eq (5)) and analytical pressure wave (see Eq (4)) have been experimentally validated for both a fluid-filled elastic (e.g., metallic) and viscoelastic (e.g., HDPE) pipe for frequencies up to 70 kHz for the probing waves.

Regarding time reversal and definition of the searching space domain, the isolated reflected wave is time reversed, such that $\Delta p(t)$ becomes $\Delta p(-t)$ if expressed in the time domain, or is phase conjugated such that $\Delta\hat{p}$ becomes $\Delta\hat{p}^*$ (where * denotes the phase conjugation operation) if the reflected wave is expressed in the frequency domain. Moreover, a vector that corresponds to the potential defect locations from the measurement position $x_m$ is defined as $\bar{x}_d=(0, \Delta x_d, \ldots, x_T)$, where $\Delta x_d \leq 0.5\lambda_{min}$. $\lambda_{min}=c_f/f_{max}$, where $f_{max}$ is the maximum frequency contained in the injected acoustic pressure signal $\hat{f}(\omega)$. $x_T$ denotes the limit of the searching space domain, and depends on the longitudinal extension of the fluid-filled pipe system. $\bar{x}_d$ may also called a potential defect location vector.

Next an objective function can be obtained. The objective function calculated at a given location $\bar{x}_d$ is represented by $A(\bar{x}_d)$ (also identified as the ambiguity function of the Bartlett matched-field processor in some scenarios) and can be defined as an inner product of the phase conjugated measured response $\Delta\hat{p}^*$ and the analytical response g($\omega$) at $\bar{x}_d$ as below:

$$A(\bar{x}_d) = |g(\bar{x}_d, \omega)\Delta\hat{p}^*(\omega)|^2 \tag{8}$$

where $|\cdot|^2$ is the Euclidian norm of a function. The fact that the phase conjugated measured response is the optimal filter that maximizes the attainable SNR under a Gaussian noise assumption is demonstrated analytically in the following. The analytical response g($\omega$) is defined in the frequency domain as:

$$g(\bar{x}_d, \omega) = -i\omega S_D\hat{f}(\omega)\hat{G}(\bar{x}_d \mid x_s)\hat{G}(x_m \mid \bar{x}_d) \tag{9}$$

where i is the imaginary unit, and $S_D$ is a parameter that encapsulates or embodies the physical properties of the defect, such as its size. Eventually, both the analytical response g($\omega$) and the objective function $A(\bar{x}_d)$ are calculated for the frequency bandwidth $\omega$ and searching space domain $\bar{x}_d$.

The calculated values of the objective function $A(\overline{x}_d)$ are plotted against the vector $\overline{x}_d$, and the proven validity of wave time reversal ensures that the observed maximum of the objective function corresponds to the location of the defect. That is:

$$\overline{x}_d = \arg \max_{\overline{x}_d} A \qquad (10)$$

Next will prove that the time reversed (or phase conjugated if in frequency domain) response is the optimal filter. In essence, the functional A in Eq (8) defines the signal to noise power ratio (SNR), and it is provable that the time reversed response is the optimal filter to maximize said ratio assuming the noise follows a Gaussian distribution. Consider Eq (2) divided through by $\hat{f}(\omega)$:

$$\hat{G}^d(x_m, \omega \mid x_s) - \hat{G}(x_m, \omega \mid x_s) = \beta \hat{G}(\overline{x}_d, \omega \mid x_s)\hat{G}(x_m, \omega \mid \overline{x}_d) + \varepsilon \qquad (11)$$

where $\hat{G}^d$ is the experimentally obtained Green's function from the defective pipeline, $\hat{G}$ is the pertinent analytical Green's function, $\beta = -i\omega S_D$, and $\varepsilon$ is the noise and model error vector that follows a zero-mean Gaussian distribution $N(0, \sigma^2 I_N)$ with $I_N$ being the N dimensional identity vector. In a compact form, Eq (11) may be rewritten as:

$$u' = v' + \varepsilon \qquad (12)$$

where $$u' = \left[\hat{G}^d(x_m, \omega_1 \mid x_s) - \hat{G}(x_m, \omega_1 \mid x_s), \ldots, \hat{G}^d(x_m, \omega_N \mid x_s) - \hat{G}(x_m, \omega_N \mid x_s)\right]^T \qquad (13)$$

$$v' = \left[\beta \hat{G}(\overline{x}_d, \omega_1 \mid x_s) - \hat{G}(x_m, \omega_1 \mid \overline{x}_d), \ldots, \beta \hat{G}(\overline{x}_d, \omega_N \mid x_s) - \hat{G}(x_m, \omega_N \mid \overline{x}_d)\right]^T \qquad (14)$$

Since the response comprises N frequencies, consider a unit vector w (i.e., $\|w\|=1$) for the purpose of maximizing the SNR of Eq (12). The output function is equivalent to applying a filter $w^H$ to the measured signal u':

$$w^H u' = w^H v' + w^H \varepsilon \qquad (15)$$

The SNR is then defined as:

$$SNR = \frac{\|w^H v'\|^2}{E(\|w^H \varepsilon\|^2)} \qquad (16)$$

where E denotes the expectation. The optimal filter $\hat{w}$ is determined by maximizing the SNR with respect to w as follows:

$$\hat{w} = \arg \max_w \frac{\|w^H v'\|^2}{E(\|w^H \varepsilon\|^2)} = \arg \max_w \frac{\|w^H v'\|^2}{\sigma^2(\|w^H\|^2)} \qquad (17)$$

where the subscript H denotes the conjugate transpose and arg max represents the argument of the maximum over all w. Using the Cauchy-Schwarz inequality, Eq (17) leads to:

$$SNR = \frac{\|w^H v'\|^2}{\sigma^2(\|w^H\|^2)} \le \frac{\|w^H\|^2\|v'\|^2}{\sigma\|w^H\|^2} = \frac{\|v'\|^2}{\sigma^2} \qquad (18)$$

Therefore, the optimal filter $\hat{w}$ is obtained from the equality condition:

$$\hat{w} = \frac{v'}{\sqrt{v'^H v'}} \Rightarrow \hat{w}^H = \frac{v'^H}{\sqrt{v'^H v'}} \qquad (19)$$

where $v'^H$ is the phase conjugated (i.e., time reversed) v'. Hence, the time reversed signal is the best to convolve with to maximize the SNR. Inserting Eq (19) into Eq (18) yields:

$$\max SNR = \frac{u'^H v' v'^H u'}{v'^H v'} = f(\overline{x}_d) \qquad (20)$$

That is, the maximum depends on $\overline{x}_d$. Then, the defect location $\overline{x}_d$ can be estimated by maximizing Eq (20):

$$\overline{x}_d = \arg \max_{\overline{x}_d} \frac{u'^H v' v'^H u'}{v'^H v'} \qquad (21)$$

a result that is mirrored in Eq (10).

The above described wall impedance (see Eq (5)) and acoustic Green's function (see Eq (4)) equations are derived under the assumption of an axisymmetric pressure field, excited by the acoustic source positioned along the pipe centerline (i.e., $x_s=(x_s, 0, 0)$). As axisymmetric propagating modes are still excited for a source positioned at $\theta$, $r \neq 0$, the presented technique according to one or more embodiments can be applicable for a mixed axisymmetric/asymmetric pressure field, where the analytical model can partly resolve.

For a defective fluid-filled pipe case that cannot be adequately represented by the analytical pressure wave solution, a more appropriate numerical model may be employed to obtain $g(\omega)$ for different potential defect locations $\overline{x}_d$. It will be understood that the above described implementation according to one or more embodiments offers advantages of an almost real-time defect detection, due to the fast computation speed of the analytical solution in Eq (9), as opposed to more resource-intensive numerical schemes.

FIG. 1A illustrates only one defect in the form of a leak. This is for illustrative purpose only. The defect may be a blockage. In some embodiments, there may be multiple defects. For example, when multiple scatterers are present along the pipe, the objective function $A(\overline{x}_d)$ will present multiple local maxima, each corresponding to the location of a potential defect. Typically, the highest peak corresponds to the strongest scatterer (most severe defect).

In FIG. 1A, the fluid is water, the pipe is an elastic cylindrical pipe, and the acoustic source is disposed along the pipe centreline. It will be understood these are for illustrative purpose only to elaborate one or more concepts of the present disclosure. In some embodiments, the fluid may be oil, gas, or mixture of one or more fluids, other than water. The pipe may have a non-cylindrical shape. The acoustic source may be disposed in a position other than along the pipe centreline.

Figure 2:
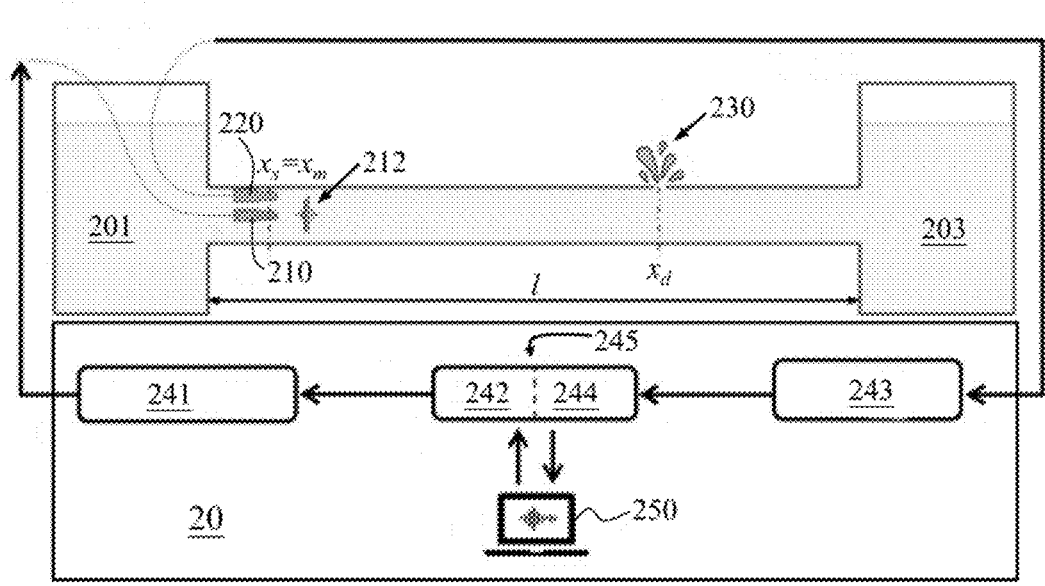
FIG. 2 illustrates an experimental setup for defect detection according to certain embodiments of the present disclosure.

FIG. 2 illustrates a pipeline system setup model for defect detection at a hydraulic lab in Hong Kong University of Science and Technology (HKUST). The technique proposed herein according to one or more embodiments has been tested or applied at the hydraulic lab to successfully locate both simulated leaks and blockages. In the hydraulic lab, the system setup comprises five pipes in total and the total length (l) of the pipes is 6.5 m. The pipes connect two water-filled reservoirs 201 and 203 at their ends. The pipes installed on the setup have either different geometrical or mechanical characteristics from each other and are supported by aluminum frames to the lab floor. The pipes are inclined by 1% with respect to the horizontal plane, so that air entrapments are avoided during the filling process of the system. A piston-like block of fabrics is transversed along the pipes to ensure that the system is free from air. This can avoid scenarios where air cavities or bubbles act as potential pressure wave scatterers and disturb the test.

The computer device 20 implements the theoretical step as described with reference to one or more embodiments. In the computer device 20, an electronic computer 250 generates a digital electrical signal (e.g., Gaussian or Linear frequency modulated sine pulse) in the digital domain. The digital electrical signal is then fed to a digital-to-analog converter (DAC) 242, which may be a stand-alone device or a portion of a general data acquisition (DAQ) device 245, to create a continuous (in time) analog electrical signal. In the present embodiment, the DAQ device 245 is a National Instruments™ USB-6356 I/O board. In some embodiments, the output voltage of the DAC 242 or DAQ device 245 may not be adequate to drive a piezoelectric transducer. Thus, a power amplifier 241 (e.g., Brüel & Kjaer Type 2713 Power Amplifier) communicates with the DAC 242 or DAQ device 245 and amplifies the analog electrical signal to obtain an amplified analog electrical signal with a gain. The acoustic source or projector 210 (e.g., a Brüel & Kjaer Type 8104 hydrophone) is placed along the fluid-filled centerline (i.e, $r=\theta=0$) at $x_s$. A transducer (e.g., a Brüel & Kjaer Type 8104 hydrophone) is placed at $x_m$ ($x_s$, R, 0) and acts as an acoustic receiver 220.

The power amplifier 241 communicates with the acoustic projector 210 such that the acoustic projector 210 is stimulated or excited by the amplified analog electrical signal and generates the probing wave 212 that propagates in the pipeline system. At $x_d$, a defect 230 is introduced (for example, the defect 230 may be realised as an item that resembles a blockage, or an orifice in the pipe wall that simulates a leak) that functions as a wave scatterer. Hence, the injected probing wave is scattered by the defect 230, and is partially or wholly reflected towards the acoustic receiver 220 at $x_m$. The acoustic receiver 220 measures the response of the defective system to the probing wave 212, and the measured response is fed into a signal conditioner 243 (e.g., Brüel & Kjaer Type 2692-A Nexus Charge Amplifier). The signal conditioner 243 can be a charge amplifier and amplifies the measured response and reduce noise, such as nullifying the degrading capacitance effect of the connecting cables (i.e., from the transducer to the signal conditioner). The measured response is an analog electrical signal. An analog-to-digital converter (ADC, which is standalone or embedded in a DAQ 245) 244 samples the analog electrical signal, converts it into a digital electrical signal and stores digital electrical signal in the memory/hard disk of the computer 250. The sampling rate for both the DAC and ADC operations may be at least equal to 10 times the highest frequency component in the probing wave 212. Also, the acoustic source 210 and acoustic receiver 220 may be at different locations longitudinally (i.e., $x_s \neq x_m$), or be combined in a single transducer that will switch from an emitter to a receiver as soon as the transmission of the probing wave is complete.

Following the experimental step is the theoretical step. The obtained signal (i.e., measured response) from the experimental step may comprise (i) the response of an intact fluid-filled pipe $p^{intact}$; (ii) the effect of the defect $p^{defect}$, and (iii) the measurement noise n. $\Delta p = p^{defect} + n$ can be isolated from the overall measured response. This can be done more easily for the case where $x_s = x_m$, since the scattered wave will arrive later than the first incident wave to the receiver and can be more easily identified in the waveform. A Fast Fourier Transform (FFT) is then applied to the extracted $\Delta p$ to yield $\Delta \hat{p}$ in the frequency domain. $\Delta \hat{p}$ is then time reversed to obtain $\Delta \hat{p}^*$. The simulated analytical defect response or analytical response can be predetermined, such as being calculated according to Eq (9). The known geometrical and mechanical system properties are inputted in the characteristic equation (i.e., Eq (7)), to yield the valid frequency/axial wavenumber ($\omega$, $k_{r\mu}$) pairs for the fluid-filled pipe waveguide. Once the ($\omega$, $k_{r\mu}$) pairs are found, the impedance equation (i.e., Eq (5)) can be calculated for each propagating mode at a given frequency $\omega$ and also, by extension, the acoustic Green's function at x for an acoustic source at $x_s$ as a summation over the propagating modes $\mu$ (Eq (4)). Subsequently, Eq (9) is calculated as the product of (i) the probing signal $\hat{f}(\omega)$ (as expressed in the frequency domain), (ii) the Green's function at a potential defect location $\bar{x}_d$ for a source at $x_s$, (iii) the Green's function at the receiver location $x_m$ for a potential (scattered) wave source at $\bar{x}_d$, and (iv) $S_D$ that encapsulates the physical parameters of the defect (e.g., size). Note that Eq (9) is estimated over the excited frequency bandwidth $\omega$, and for multiple values for $\bar{x}_d$ that constitute the search domain. The next step is to compute Eq (8), that is the inner product of the phase conjugated experimental defect response $\Delta \hat{p}^*$ with the analytically obtained response $g(\omega)$. The validity of wave time reversal guarantees that Eq (8) is maximized at the location of the actual defect (Eq (10)). The technique has been implemented to locate both blockages and leaks, and one representative case for each type of defect is demonstrated later below.

Figure 3:
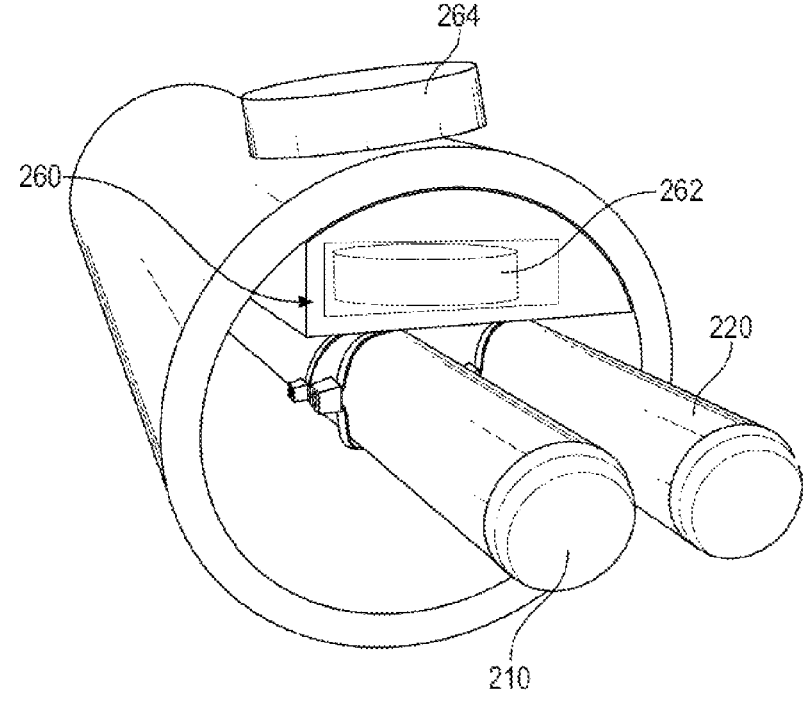
FIG. 3 illustrates a configuration of the acoustic source and the acoustic receiver in a pipe via a 3D-printed base with a magnet pair according to certain embodiments of the present disclosure.
Figure 4:
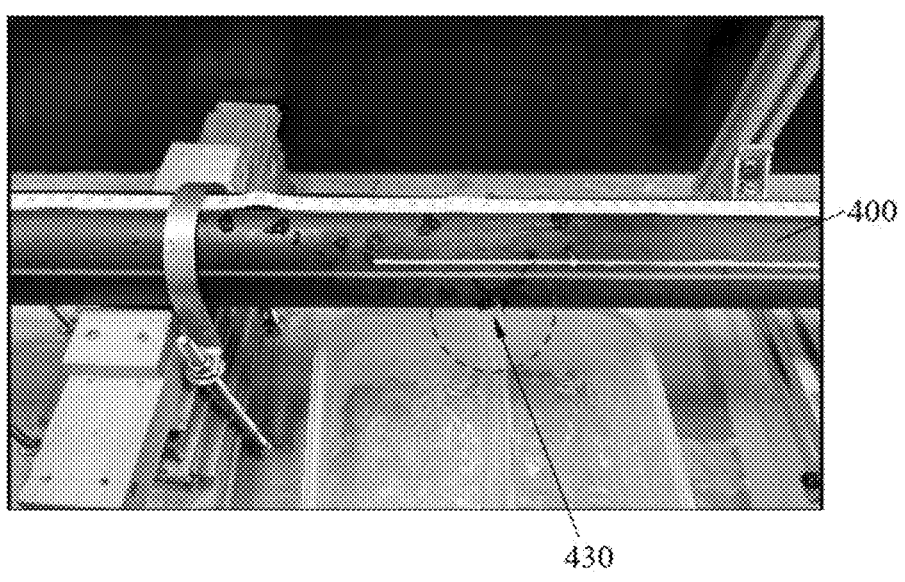
FIG. 4 shows an orifice functioning as a leak of a water-filled DN50 HDPE pipe according to certain embodiments of the present disclosure.

FIG. 3 shows how the acoustic projector 210 and receiver 220 are arranged. A base in the form of a 3D-printed resin base 260 houses both the acoustic projector 210 (at r=0) and acoustic receiver 220 (at r=R). To keep the transducers at their intended radial positions, the base 260 embeds a first magnet 262 that makes a pair with a second magnet 264 at the outer surface of the pipe wall. Further, the base 260 ensures that the transducer pair is mounted at the desired location radially, and allows to change their longitudinal position along the pipe by translation of the second magnet 264.

Leak Case

Referring to FIGS. 4, 5A, 5B, 5C and 5D, this example employs a water-filled DN50 HDPE pipe 400 (inner radius R=27.7 mm, wall thickness h=3.8 mm). The experimental setup is similar to that as shown in FIG. 2 at the hydraulic lab of HKUST. A 2 cm diameter orifice 430 is formed through the pipe wall of the pipe 400 to simulate a leak. The system is probed with a short Gaussian modulated sine pulse with $f_c$=22 kHz in order to locate the leak 430 relative to the transducer array following the application of the proposed technique herein according to one or more embodiments.

The transducer array is realized as two Brüel & Kjaer Type 8103 hydrophones, one acting as an acoustic projector and mounted at $x_s$(0, 0, 0) and the other being the receiver at $x_m$(0, R, 0). The mounting of the two transducers is similar to that shown in FIG. 3. The first test is conducted in an intact pipe to set a baseline. This is not required by the proposed methodology according to the present disclosure and is performed merely for purpose of demonstration. The probing pulse is a Gaussian modulated sine pulse with central frequency $f_c$=22 kHz, 20% relative bandwidth [19.8, 24.2] kHz, and 5V amplitude. The signal is defined in a computer (such as computer 250) and converted to the analog domain using a National Instruments™ USB-6356 DAQ I/O board with 16-bit accuracy and at 1 MHz sampling rate. Before being fed to the acoustic projector for emission of the probing pulse, the signal is amplified by 30 dB on a Brüel & Kjaer Type 2713 Power Amplifier. Concurrently, the analog electric circuit that is connected to the receiving transducer starts with the pressure response acquisition. The recorded signal is amplified and conditioned by a Brüel & Kjaer Type 2692-A Nexus Charge Amplifier, sampled at a 1 MHz rate at the same National Instruments™ USB-6356 DAQ I/O board, and stored at the computer in digital form. The obtained waveform is plotted in FIG. 5B.

Figure 5A:
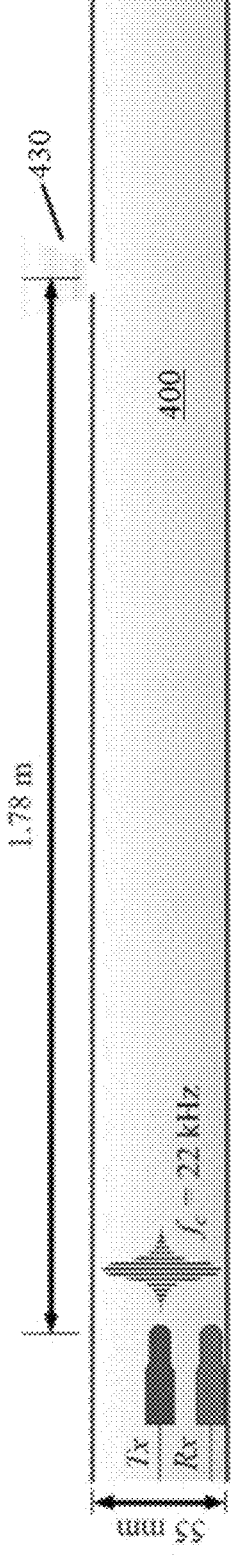
FIG. 5A illustrates a pipeline model for the pipe of FIG. 4, where the location of the leak is 1.78 m from the acoustic source.
Figure 5B:
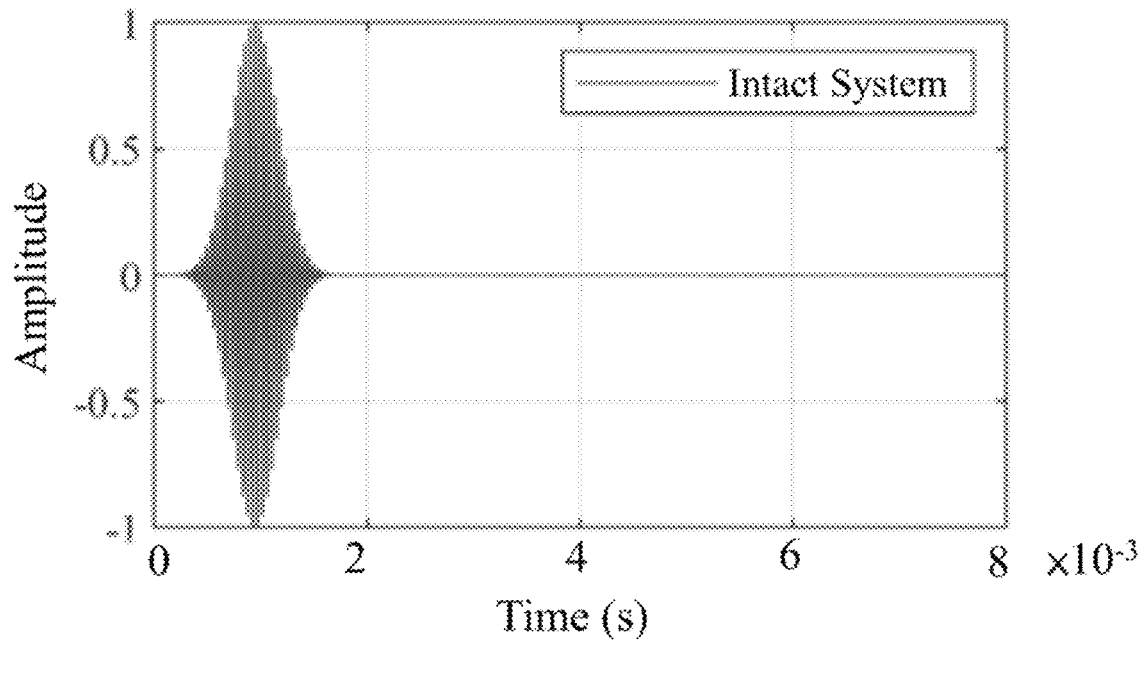
FIG. 5B shows the response of the intact system measured at the acoustic receiver for a Gaussian modulated sine pulse of $f_c$=22 kHz and 20% relative bandwidth emitted at the acoustic source for the pipeline model of FIG. 5A before the leak is introduced.
Figure 5C:
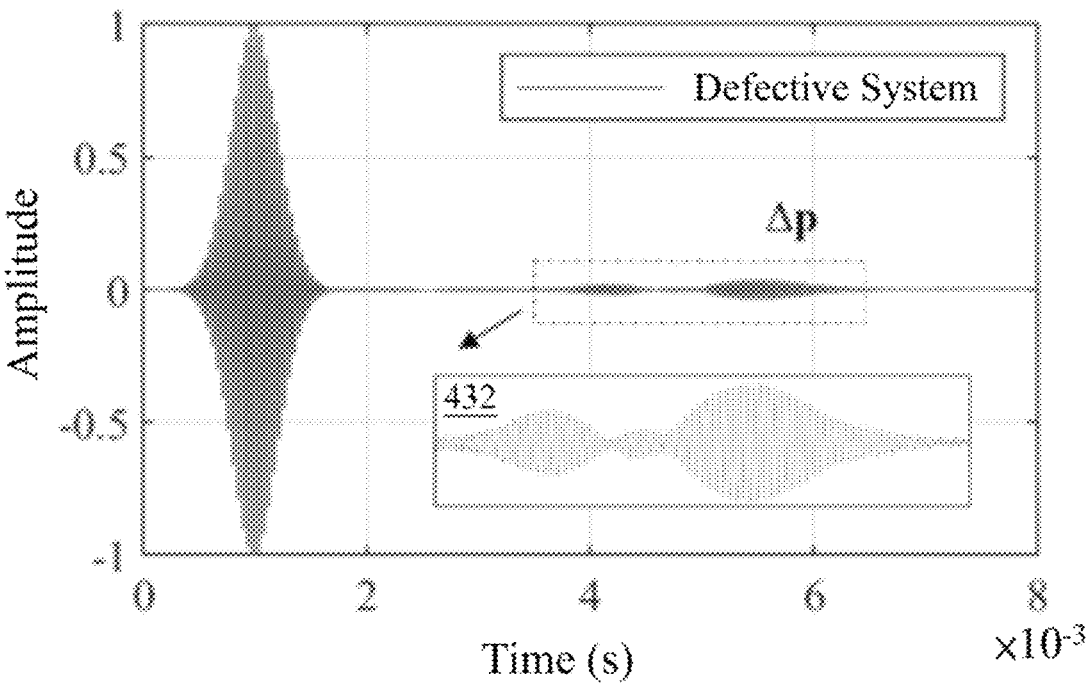
FIG. 5C shows the response of the defective system measured at the acoustic receiver for a Gaussian modulated sine pulse of $f_c$=22 kHz and 20% relative bandwidth emitted at the acoustic source for the pipeline model of FIG. 5A after the leak is introduced.
Figure 5D:
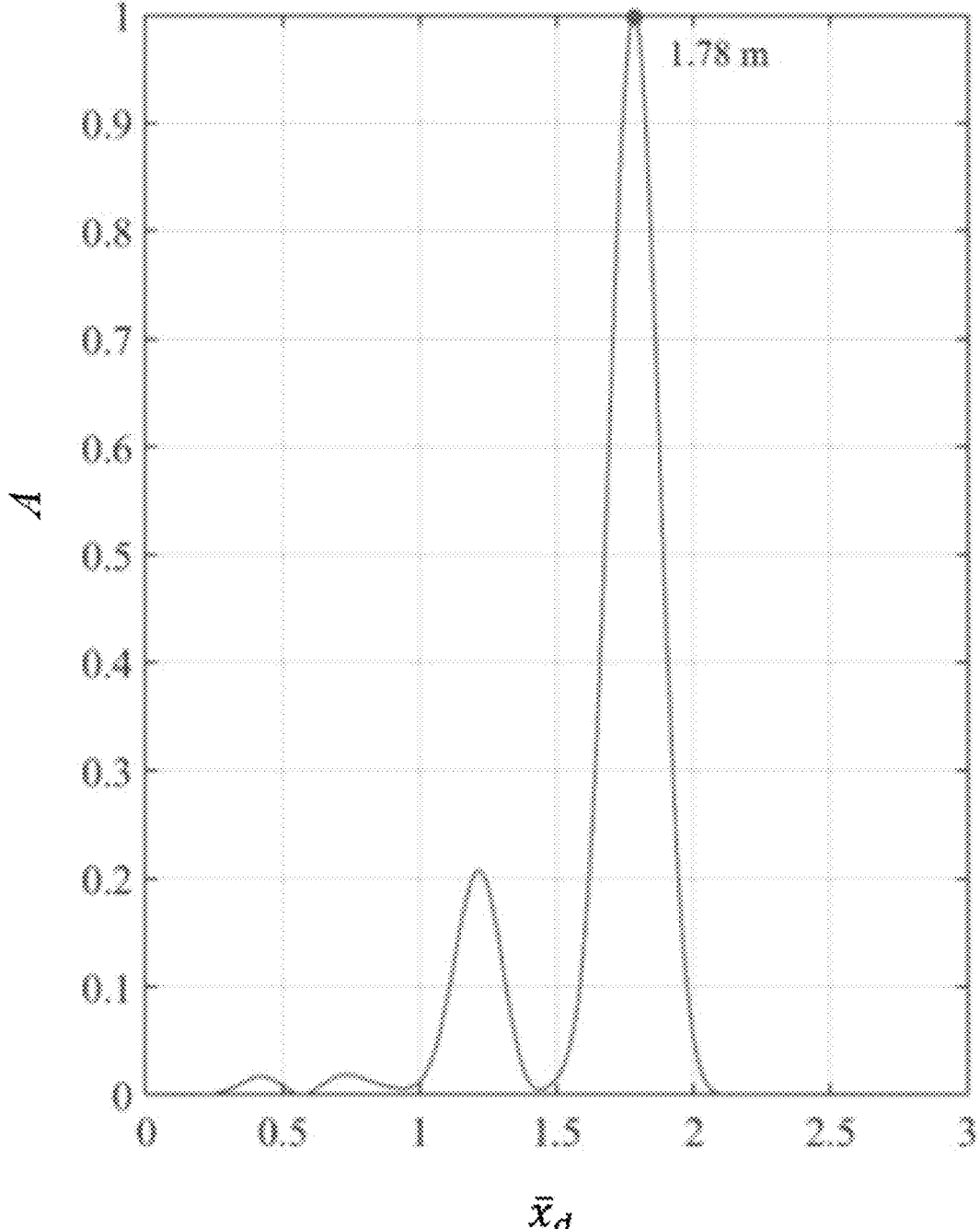
FIG. 5D is a curve showing objective function vs $\bar{x}_d$ for the pipeline model of FIG. 5A.

The circular orifice as the leak 430 is located at $x_d$ (1.78 m, 0, 0). As water flows through the orifice, the defective system is probed with the same Gaussian modulated sine pulse with central frequency $f_c$=22 kHz and 20% relative bandwidth that is injected in the intact system. As is the case for the intact system, the incident wave that corresponds to $p^{intact}$ arrives first at the receiver. However, for the case of the defective pipe, an additional pulse 432 is observed arriving at the receiver at time $t\sim4\times10^{-3}$ s attributable to the leak in the system at $x_d$ (FIC. 5C). That pulse corresponds to $\Delta p$ and is therefore isolated and transformed to the frequency domain to obtain $\Delta\hat{p}$ in course of the theoretical step. Next, the analytical response $g(\omega)$ is calculated for the geometrical and mechanical properties of the water-filled DN50 HDPE pipe 400, with excited bandwidth $\omega$ and defect search domain $\bar{x}_d$=[0, 3] m split in 1 cm intervals. Besides, a random value for the $S_D$ (its value is 1) parameter is considered, since the priority lies with locating, rather than characterizing, the leak 430. The phase conjugation of the obtained response $\Delta\hat{p}^*$ is obtained and its inner product with the analytical response at each of the 301 possible defect locations is computed to yield function A. FIG. 5D plots A as a function of the search domain and obtains a bell-shaped curve that peaks at $\bar{x}_d$=1.78 m, thereby accurately identifying the real leak location.

Blockage Case

Figure 6A:
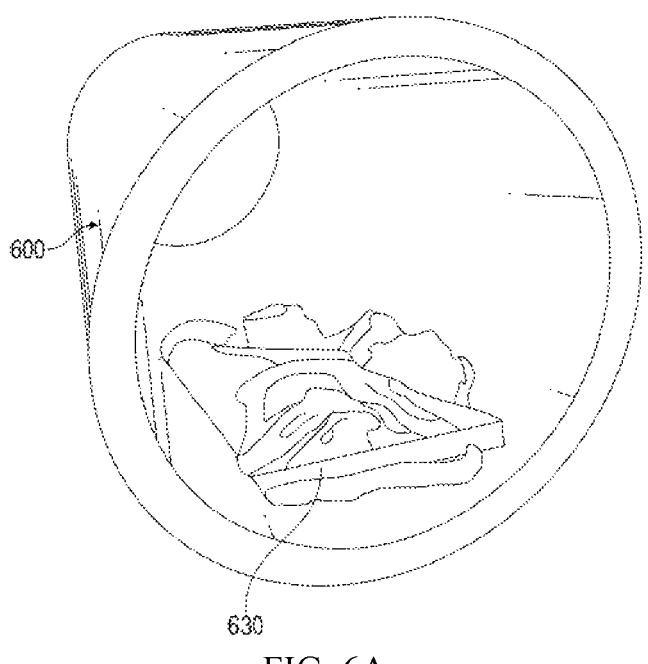
FIG. 6A shows a bitumen piece functioning as a blockage inside a water-filled DN80 HDPE pipe, covering about one-fifth (20%) of its cross-sectional area of the pipe.
Figure 6B:
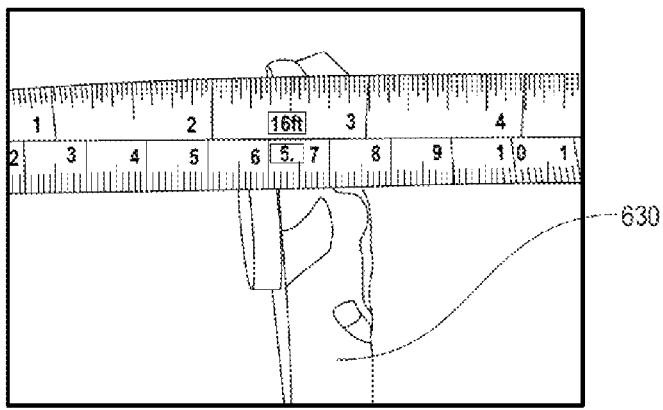
FIG. 6B shows the thickness of the bitumen piece of FIG. 6A.
Figure 6C:
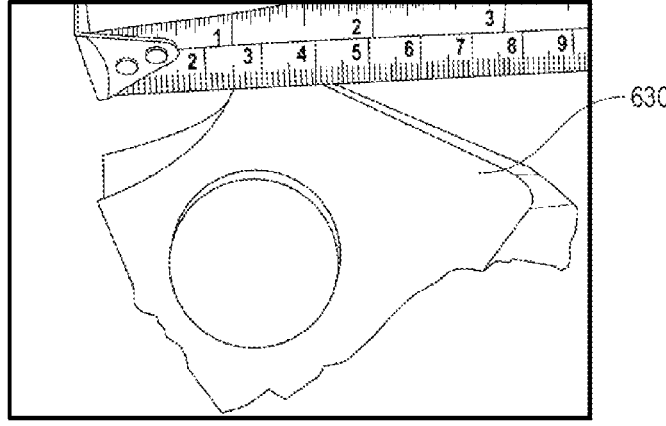
FIG. 6C shows the overall height of the bitumen piece of FIG. 6A.

A common defect found in pipeline systems are blockages, caused by calcifications and sediment depositions, that result in increasing demands from pumps and energy loses. In order to demonstrate the resolution benefits of using high frequency waves for the diagnosis of pipelines, referring to FIGS. 6A-7D, a small bitumen piece 630 that originates from the failed lining of a cast iron pipe is inserted in a water-filled DN80 HDPE (R=0.04 m, h=5.4 mm) pipe 600 as a target for locating. Therefore, the aim is to demonstrate the proposed technique is appliable not only for the detection of relative large blockages (>50% of the pipe cross-sectional area) but also for wall thinning events. The particular bitumen fragment as shown in FIGS. 6A, 6B and 6C has dimensions of 9×6×1.5 cm (L×W×T) and covers 20% of the cross-sectional area of the DN80 HDPE pipe 600. The stated dimensions also include a small cylindrical magnet that is glued to the bitumen piece to facilitate its placement along the pipe, as it enables its control by a magnet on the outer pipe surface. The transducer array in this case is made up of two Brüel & Kjaer Type 8104 hydrophones, the acoustic source being along the pipe centerline $x_s$(0, 0, 0) and the acoustic receiver at the perimeter $x_m$(0, R, 0). The transducers are installed on a 3D-printed base, similar to that shown in FIG. 3.

Figure 7A:
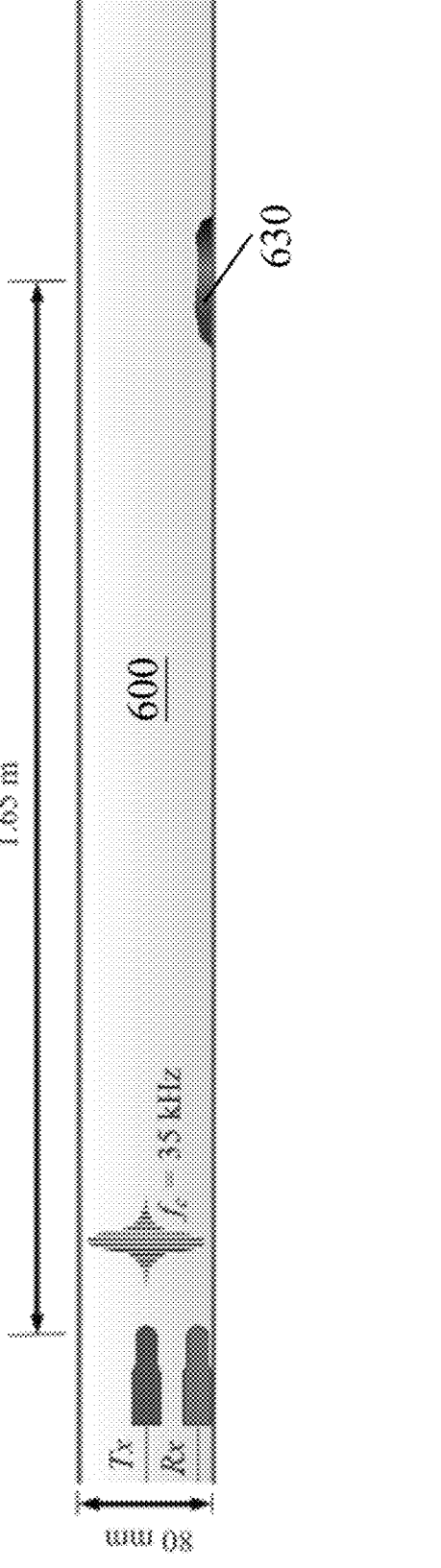
FIG. 7A illustrates a pipeline model for the pipe of FIG. 6A, where the location of the blockage is 1.65 m from the acoustic source.
Figure 7B:
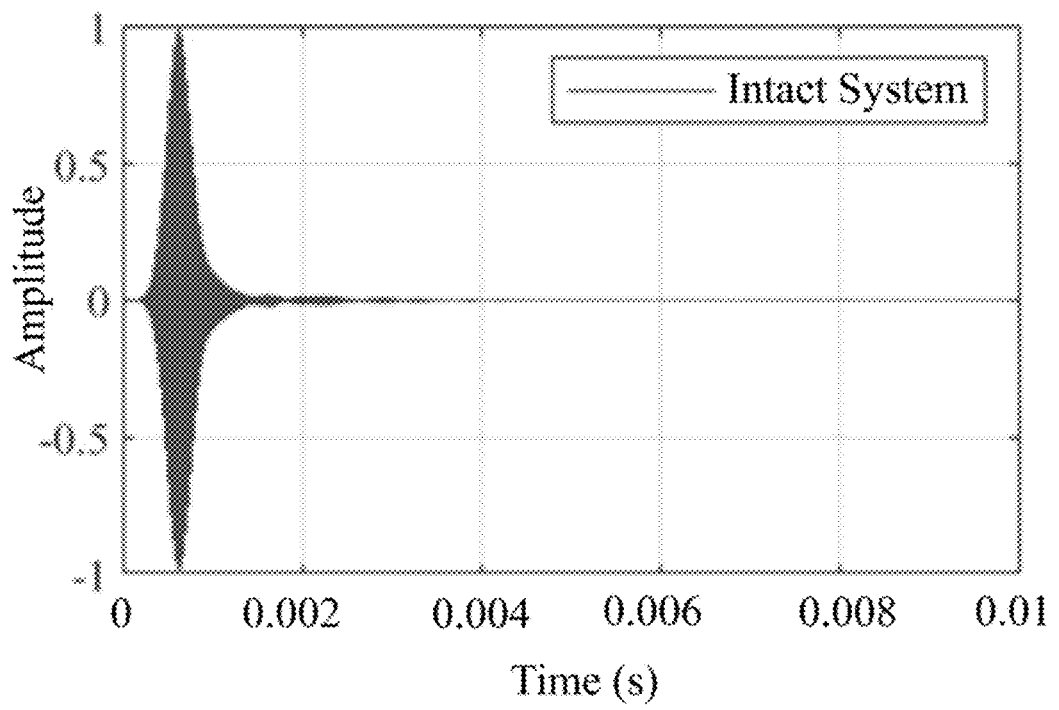
FIG. 7B shows the response of the intact water-filled DN80 HDPE pipe measured at the acoustic receiver for a Gaussian modulated sine pulse of $f_c$=22 kHz and 20% relative bandwidth emitted at the acoustic source for the pipeline model of FIG. 7A before the blockage is introduced.
Figure 7C:
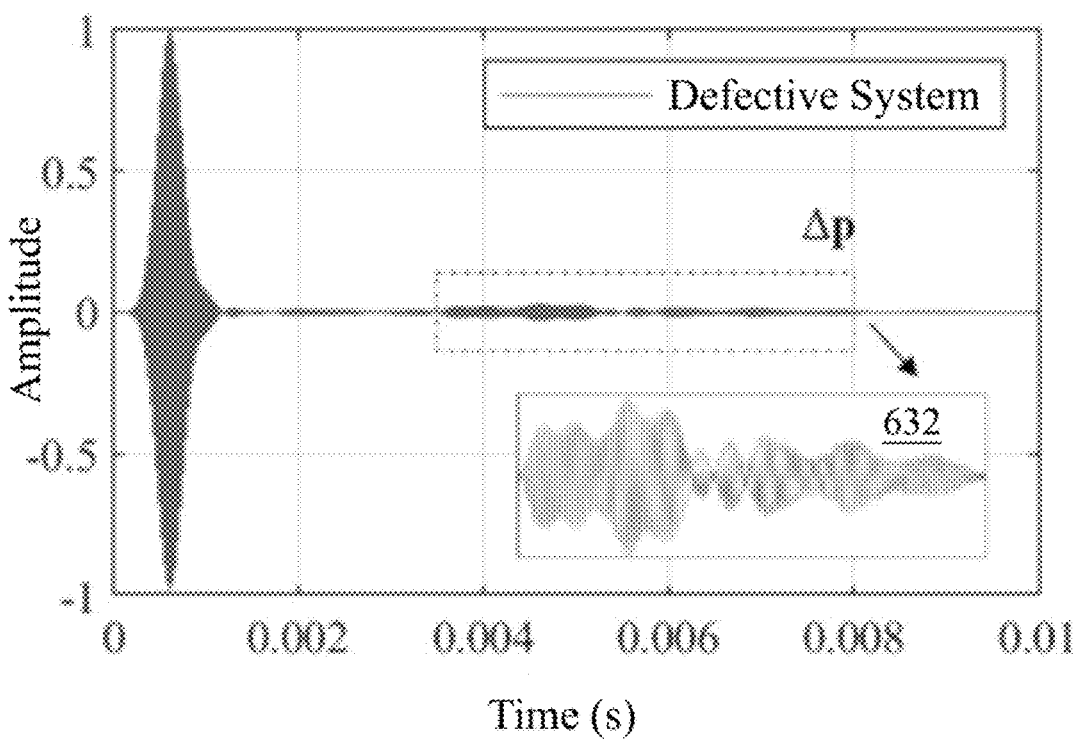
FIG. 7C shows the response of the defective water-filled DN80 HDPE pipe measured at the acoustic receiver for a Gaussian modulated sine pulse of $f_c$=22 kHz and 20% relative bandwidth emitted at the acoustic source for the pipeline model of FIG. 7A after the blockage is introduced.
Figure 7D:
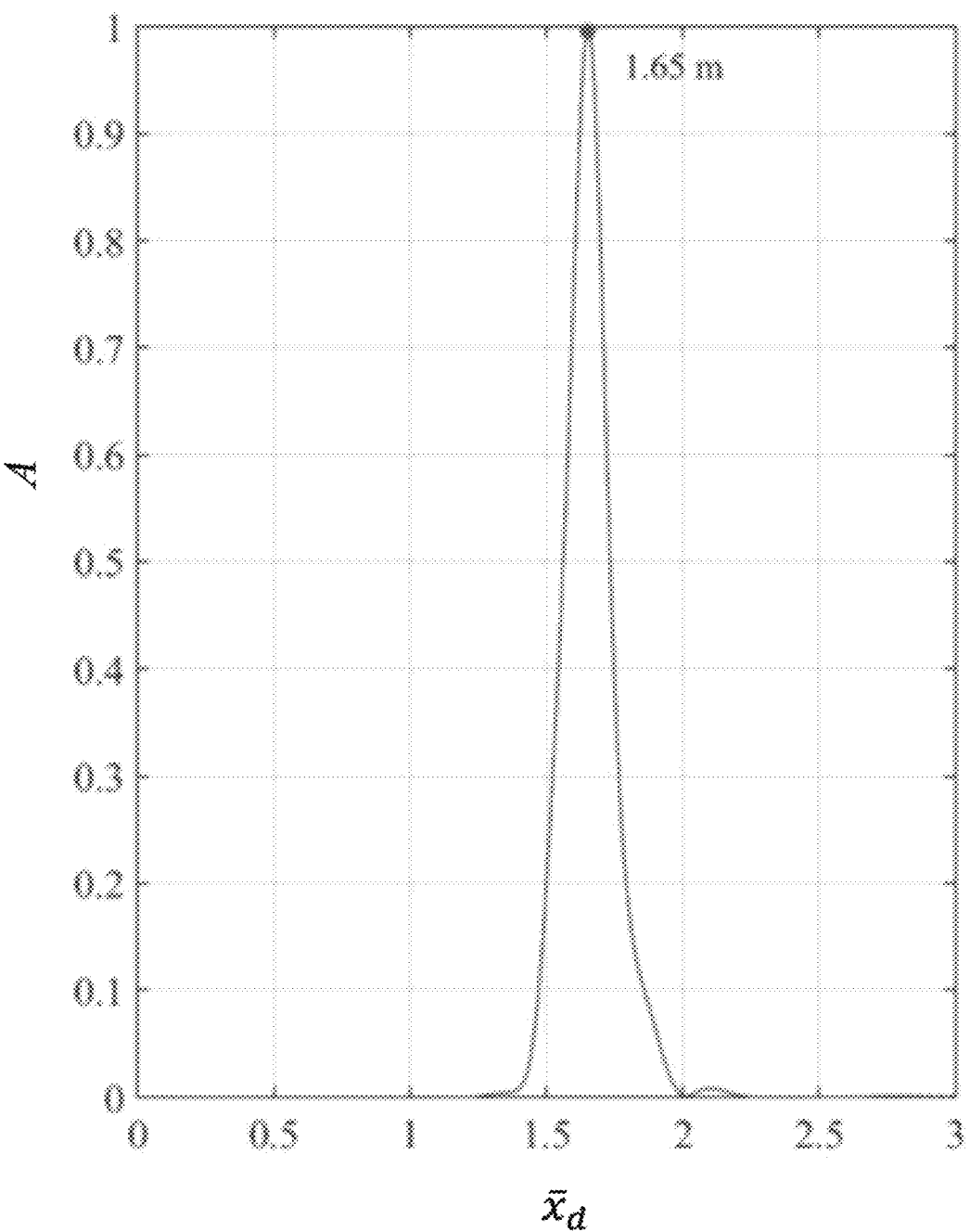
FIG. 7D is a curve showing objective function vs $\bar{x}_d$ for the pipeline model of FIG. 7A.

Before the blockage 630 is incorporated into the pipe 600, the pipeline system is probed at its intact state by a Gaussian modulated sine pulse of $f_c$=35 kHz and 20% relative bandwidth [31.5, 38.5] kHz to obtain a baseline for better revealing the difference to the signal from a defective system, $\Delta p$. Thus, the response of the intact system to the probing signal at $x_m$ is shown in FIG. 7B. Note that the remaining instrumentation details are identical to the leak case as described above and are omitted here for concise. Next, the bitumen piece 630 is placed in the water filled DN80 HDPE pipe 600 at a distance $x_d$=1.65 m from the transducer array, and the pipeline system is probed again with the same Gaussian modulated sine pulse (i.e., $f_c$=35 kHz, 20% relative bandwidth). The response at $x_m$ is plotted in FIG. 7C. While identical to the intact case up to time $t$=3.5×10$^{-3}$ s, FIG. 7C shows a discernible pulse 632 at later time t. That wave packet is effect of the bitumen blockage 630 on the response and defines $\Delta p$. The experimental step is concluded, and the theoretical step may begin with transforming $\Delta p$ in the frequency domain to obtain $\Delta\hat{p}$. The analytical response $g(\omega)$ is computed for the mechanical and geometrical parameters of the water-filled DN80 HDPE pipe 600, with excited bandwidth $\omega$ and search domain $\bar{x}_d$=[0, 3] m at 1 cm increments. As already noted for the leak case, the defect parameter $S_D$ is assigned an arbitrary value such that $S_D$=1, since the focus of the present embodiment is to identify the defect location. Then the inner product of the phase conjugated $\Delta\hat{p}^*$ with $g(\bar{x}_d, \omega)$ is calculated to obtain the objective function A. The maximum of the bell-shaped function A is found at $\bar{x}_d$=1.65 m (FIG. 7D), which is the actual location of the bitumen debris 630.

As used herein, the terms "probing wave", "probing signal", and "incident wave" have same meaning and may be used interchangeably.

As used herein, the terms "analytical model", "analytical response", have same meaning and may be used interchangeably.

As used herein, the terms "acoustic projector" and "acoustic source" have same meaning and may be used interchangeably.

It will further be appreciated that any of the features in the above embodiments of the disclosure may be combined together and are not necessarily applied in isolation from each other. Similar combinations of two or more features from the above described embodiments or preferred forms of the disclosure can be readily made by one skilled in the art.

Unless otherwise defined, the technical and scientific terms used herein have the plain meanings as commonly understood by those skill in the art to which the example embodiments pertain. Embodiments are illustrated in non-limiting examples. Based on the above disclosed embodiments, various modifications that can be conceived of by those skilled in the art would fall within spirits of the example embodiments.

What is claimed is:

1. A method of defect detection for a pressurized pipe having at least one defect, the method comprising:

generating, by an acoustic source located at $x_s$, a probing wave of a frequency range from 10 kHz to 100 kHz, the probing wave being scattered by the at least one defect to create a reflected wave;

measuring, by an acoustic receiver located at $x_m$, a wave response to obtain a measured response, the measured response being attributed essentially to a superposition of the probing wave and the reflected wave; and processing, by a computer device, the measured response to locate the at least one defect, wherein processing the measured response comprises:

determining a defect-related response $\Delta\hat{p}$ from the measured response, the defect-related response $\Delta\hat{p}$ being attributed essentially to the at least one defect and expressed in frequency domain; and computing an objective function $A(\overline{x}_d)$ by performing a convolution operation between an analytical response $g(\omega)$ and $\Delta\hat{p}^*$ such that $A(\overline{x}_d)=|g(\overline{x}_d, \omega)\Delta\hat{p}^*(w)|^2$, where $|\cdot|^2$ denotes an Euclidian norm, $*$ denotes a phase conjugation operation, $\Delta\hat{p}^*$ is phase conjugation of $\Delta\hat{p}$, $\overline{x}_d$ refers to potential defect location, and $\omega$ is a angular frequency vector.

2. The method of claim 1, further comprising:

generating, by the computer device, a digital electrical signal;

converting, by the computer device, the digital electrical signal into an analog electrical signal; and stimulating the acoustic source using the analog electrical signal such that the probing wave is generated.

3. The method of claim 1, wherein processing the measured response comprises:

sampling the measured response at a sampling frequency that is at least ten times of a maximum frequency of the frequency range.

4. The method of claim 1, further comprising configuring the acoustic source and the acoustic receiver such that $x_s=x_m$.

5. The method of claim 1, further comprising configuring the acoustic source such that the acoustic source is positioned along a centerline of the pressurized pipe.

6. The method of claim 1, wherein processing the measured response further comprises computing $g(\overline{x}_d, \omega)$ such that $$g(\overline{x}_d, \omega) = -i\omega S_D \hat{f}(\omega)\hat{G}(\overline{x}_d \mid x_s)\hat{G}(x_m \mid \overline{x}_d)$$

where i is an imaginary unit, and $S_D$ is a parameter related to physical properties of the at least one defect, $\hat{f}(\omega)$ denotes the probing wave in frequency domain, and $\hat{G}$ is Green's function.

7. The method of claim 1, wherein processing the measured response further comprises determining defect location for the at least one defect by identifying maximum of the objective function.

8. The method of claim 7, wherein processing the measured response further comprises:

plotting the objective function $A(\overline{x}_d)$ against $\overline{x}_d$, and identifying one or more local maxima, each of the local maxima corresponding to a defect location.

9. A system of defect detection for a pressurized pipe having at least one defect, the system comprising:

an acoustic source located at $x_s$ along the pressurized pipe for generating a probing wave of a frequency range from 10 kHz to 100 kHz;

an acoustic receiver located at $x_m$ for obtaining a measured response that comprises a superposition of the probing wave and a reflected wave, the reflected wave being generated by scattering of the probing wave by the at least one defect; and a computer device for processing the measured response to locate the at least one defect, wherein the computer device is configured to:

determine a defect-related response $\Delta\hat{p}$ from the measured response, the defect-related response $\Delta\hat{p}$ being attributed essentially to the at least one defect and expressed in frequency domain; and compute an objective function $A(\overline{x}_d)$ by performing a convolution operation between an analytical response $g(\omega)$ and $\Delta\hat{p}^*$ such that $A(\overline{x}_d)=|g(\overline{x}_d, \omega)\Delta\hat{p}^*(\omega)|^2$, where $|\cdot|^2$ denotes an Euclidian norm, $*$ denotes a phase conjugation operation, $\Delta\hat{p}^*$ is phase conjugation of $\Delta\hat{p}$, $\overline{x}_d$ refers to potential defect location, and $\omega$ is a angular frequency vector.

10. The system of claim 9, wherein the acoustic source and the acoustic receiver are piezoelectric transducers.

11. The system of claim 9, wherein the acoustic source and the acoustic receiver are configured as a single transducer that is switchable to perform functions of an emitter or a receiver.

12. The system of claim 9, wherein the probing wave is one of the following:

a Gaussian modulated sine pulse; or a linear frequency modulated sine pulse.

13. The system of claim 9, wherein the computer device is configured to generate a digital electrical signal, and the computer device comprises a digital-to-analog converter for converting the digital electrical signal into an analog electrical signal such that the analog electrical signal stimulates the acoustic source to generate the probing wave.

14. The system of claim 9, wherein the computer device comprises a signal conditioner for amplifying the measured response and reducing noise.

15. The system of claim 9, further comprising a base for holding the acoustic source and the acoustic receiver within the pressurized pipe.

16. The system of claim 15, further comprising a first magnet and a second magnet, wherein the first magnet is held by the base and disposed within the pressurized pipe and the second magnet is disposed onto an outer surface of the pressurized pipe such that attractive force between the first and second magnets facilitates positioning of the acoustic source and the acoustic receiver within the pressurized pipe and translation of the second magnet enables changing of position of the first and second magnets along a longitudinal axis of the pressurized pipe.

17. A method of defect detection for a pressurized pipe having at least one defect, the method comprising:

receiving a measured response from an acoustic receiver, wherein the measured response comprises a superposition of a probing wave and a reflected wave, the probing wave being generated by an acoustic source and having a frequency range from 10 kHz to 100 kHz, the reflected wave being generated by scattering of the probing wave by the at least one defect;

sampling the measured response at a sampling frequency that is at least ten times of a maximum frequency in the frequency range;

determining a defect-related response $\Delta\hat{p}$ from the measured response, the defect-related response $\Delta\hat{p}$ being attributed to the at least one defect and expressed in frequency domain;

computing a conjugation operation of the defect-related response $\Delta\hat{p}$ to obtain $\Delta\hat{p}^*$;

computing an objective function by performing a convolution operation between a pre-determined analytical response and $\Delta\hat{p}^*$; and determining defect location for the at least one defect by identifying maximum of the objective function.

18. The method of claim 17, further comprising:

generating a digital electrical signal;

converting the digital electrical signal into an analog electrical signal;

amplifying the analog electrical signal to obtain an amplified analog electrical signal; and stimulating the acoustic source using the amplified analog electrical signal for generating the probing wave.

19. The method of claim 17, further comprising:

amplifying the measured response; and sampling the measured response by converting the measured response from an analog electrical signal into a digital electrical signal.

\* \* \* \* \*